April 28, 1953  A. FISHER  2,636,791

BEARING MOUNTING FOR ROTATING MACHINES

Filed May 4, 1950  2 SHEETS—SHEET 1

Inventor
Alec Fisher
by *Ernest C. Britton*
His Attorney

April 28, 1953 A. FISHER 2,636,791
BEARING MOUNTING FOR ROTATING MACHINES
Filed May 4, 1950 2 SHEETS—SHEET 2

Inventor
Alec Fisher
by Ernest C Britton
His Attorney

Patented Apr. 28, 1953

2,636,791

UNITED STATES PATENT OFFICE 2,636,791

BEARING MOUNTING FOR ROTATING MACHINES

Alec Fisher, Lynn, Mass., assignor to General Electric Company, a corporation of New York Application May 4, 1950, Serial No. 159,935

7 Claims. (Cl. 308—184)

This invention relates to improvements in bearing mountings for rotating machines.

In rotating machines (such as dynamoelectric machines) it is often desirable to provide mounting of a shaft within two antifriction bearings each having an inner and an outer race with the outer race of one of the bearings solidly affixed to a stationary portion of the machine and the outer race of the other bearing left free to slide in an axial direction to allow expansion and contraction of the shaft due to temperature variations and also to accommodate assembly tolerances. However, it is desirable to have this sliding outer race held against radial movement and also held securely against circumferential movement as rotation or attempted rotation of a bearing outer race in its housing causes fretting corrosion, scoring, vibration, pounding and other undesirable results.

It is an object of the present invention to provide simple and inexpensive means for overcoming the above-mentioned difficulties.

A further object of the present invention is to provide, in a rotating machine having an antifriction bearing unit at each end thereof, clamped outer races of the respective bearing units at each end of the machine while permitting one of the two units to move axially to compensate for engineering tolerances and differential expansions due to heat.

Broadly, the means employed in the embodiments herein illustrated and described comprises means for clamping bearings at both ends of the machine by holding the bearing unit at one end securely in usual manner and holding the bearing unit at the other end by a flexible diaphragm or disc. Radial and circumferential movement is restricted by the stiffness of the disc while axial movement is possible because of flexibility which is obtained by the diaphragm bending about circumferentially spaced points, pads, washers or other projections forming, in effect, circumferentially extending beam arms so that the diaphragm takes up end movement due to limits in manufacturing tolerances and due to expansion caused by heating.

Figure 1:
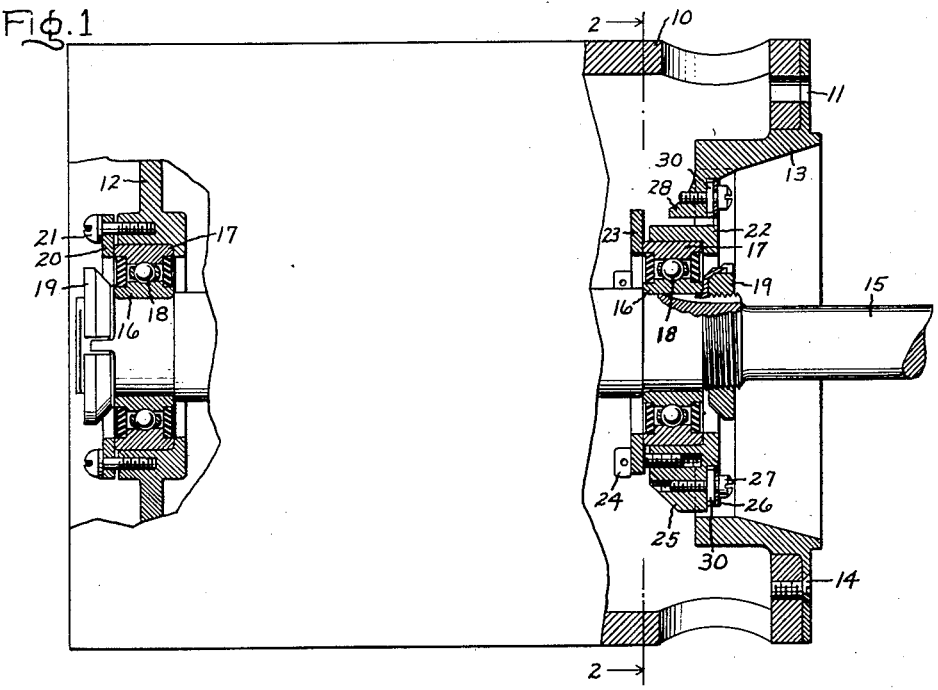
Figure 2:
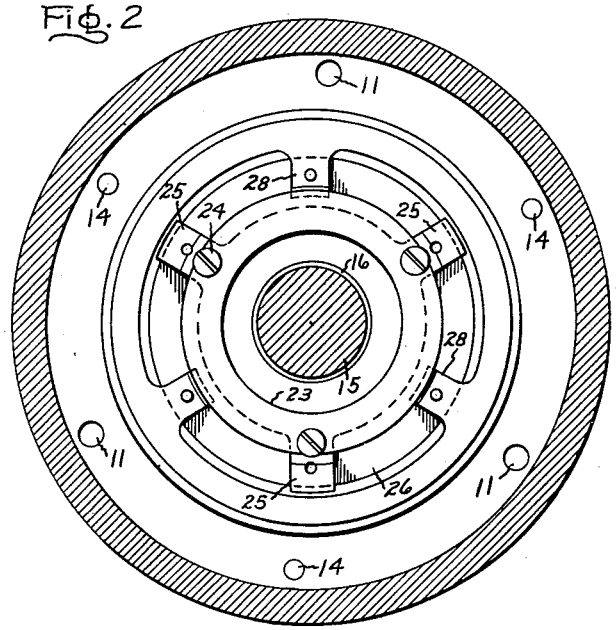
Figure 4:
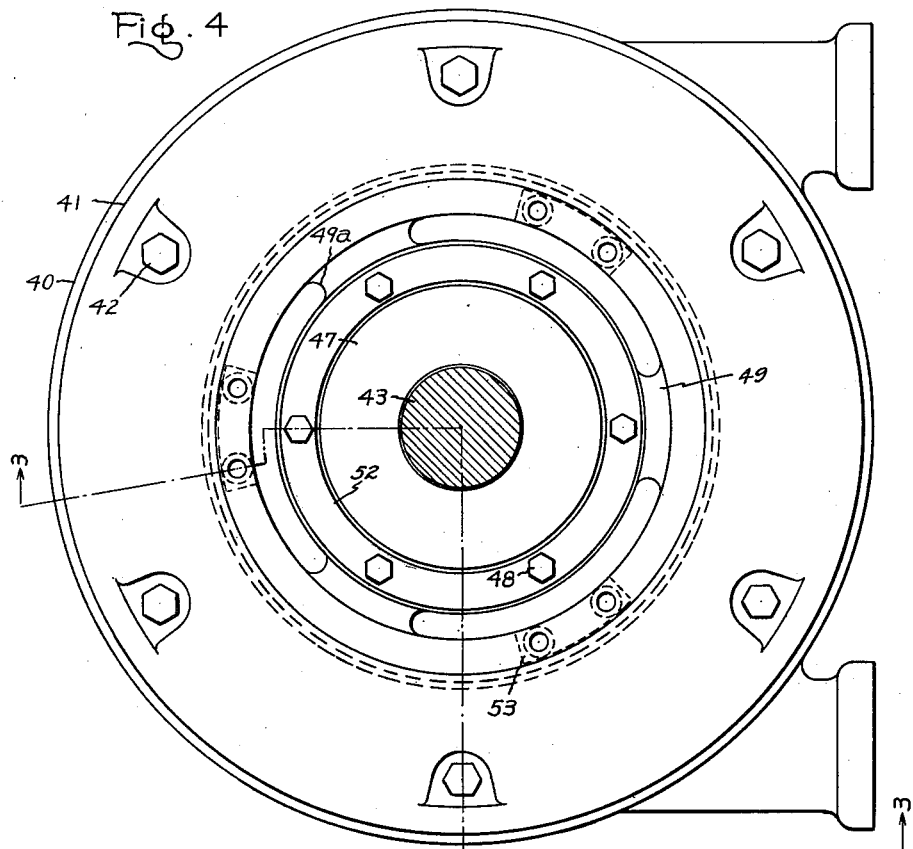
Figure 3:
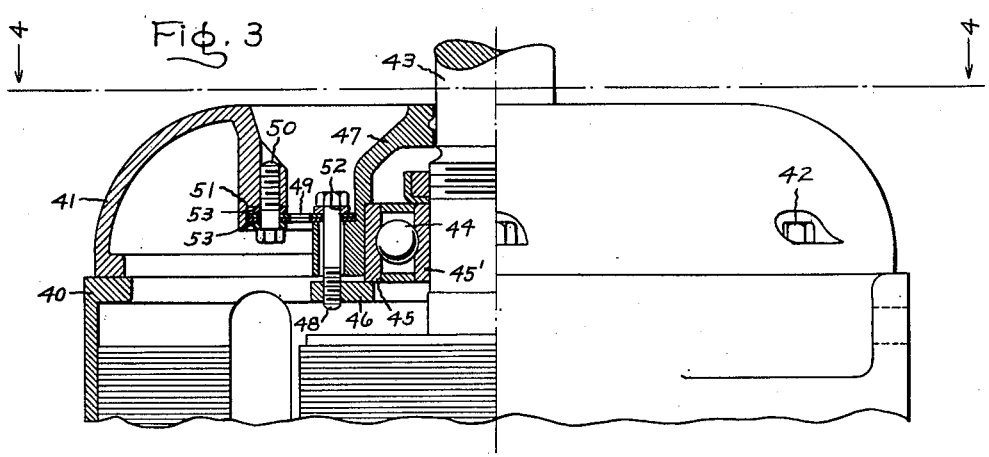

Other objects and advantages will become apparent and my invention will be better understood from consideration of the following description taken in connection with the accompanying drawing in which Fig. 1 is a side elevation, partly broken away, of an aircraft generator type of machine suitably embodying my invention; Fig. 2 is a cross-sectional view taken on the line 2—2 of Fig. 1; Fig. 3 is a side elevation of an end of an industrial type motor illustrating a modification; and Fig. 4 is an end view taken on the line 4—4 of Fig. 3.

Referring now to Fig. 1, I have shown a dynamoelectric machine such as an aircraft generator having a stationary outer frame 10 adapted to be secured as by a plurality of bolts (not shown) through mounting holes 11 to a stationary part (not shown) such as a mounting flange on an aircraft prime mover engine. The machine frame is provided with a left-hand end shield 12 and a right-hand end shield 13 which is shown secured to the frame 10 by one of a plurality of machine screws 14. The generator has a horizontally extending shaft 15 which is supported by two antifriction bearing units each comprising an inner race 16, an outer race 17 and a plurality of antifriction bearing elements 18 therebetween. The inner races are shown each secured to the shaft by a conventional nut 19 engaging a threaded portion of the shaft to press the respective inner race against an associated shaft shoulder. In the illustrated embodiment, the left-hand outer race 17 is held against both turning and axial movement by being securely clamped by a ring 20 and screws 21 within the left-hand stationary end shield 12.

The right-hand outer race 17 is, as will hereinafter be apparent, rigidly restrained only radially and circumferentially but, in order to allow for manufacturing tolerances and for thermal expansions and contractions, it is not rigidly restrained in the axial direction. This right-hand bearing unit is contained in a bearing housing or cartridge 22 with the outer race clamped against turning by a clamping ring 23 secured to cartridge 22 by a plurality of screws 24. Extending outwardly from the outer periphery of cartridge 22 are three bosses 25 which are spaced 120° apart (see Fig. 2). A thin resilient metal diaphragm 26 is secured to these bosses 25 (at the side opposite clamping ring 23) as by a plurality of screws 27. In a relatively small construction, such as that illustrated in Figs. 1 and 2, I have used with success a spring steel diaphragm of $2\frac{9}{16}$" I. D., $3\frac{5}{16}$" O. D., and .018" thickness.

The bearing support or end shield 13 is provided with three bosses 28, also spaced 120° apart, and when the parts are assembled the bearing support bosses 28 are disposed at angular intervals about midway between the cartridge bosses (i. e., spaced about 60° therefrom) to allow the maximum effective lever arm, or "beam" length, when the diaphragm is attached to the bearing support bosses 28 as by machine screws 29. In the embodiment shown in Figs. 1 and 2, I have shown a washer 30 placed between each boss (25 and 28) and the diaphragm, to permit the diaphragm to bend about each position more easily than it might about the boss alone. In order to assure concentricity of mounting, the bosses 25 and 28 may be rabbeted, as shown, to provide an annular channel in which the diaphragm is closely fitted.

In operation the flexible disc or diaphragm flexes about its points of attachment to act like three circumferentially extending beams bending in parallel while secured at their ends and with force applied to their midpoints. As the diaphragm is made thinner, or the span between supports is increased, the resilience of the diaphragm is improved, varying approximately as the cube of these dimensions.

In the embodiment shown in Figs. 3 and 4 I have dispensed with the bosses by slotting and arranging the diaphragm so that bending can be obtained without bosses or other projections adjacent the bearing cartridge as will hereinafter become more apparent. In Fig. 3 I have shown a side elevational view of an end portion of an industrial type electric motor with the top half broken away. As is also apparent in the end view of Fig. 4, the motor has an outer cylindrical frame 40 with an annular end bell 41 secured thereto, as by a plurality of bolts 42. The motor is provided with a shaft 43 which is supported in an axially floating bearing unit comprising an inner bearing race 45', antifriction balls 44, and an outer bearing race 45, with the outer race clamped by a retaining ring 46 in a bearing housing 47, ring and housing being interconnected by bolts 48. The cartridge is secured to the end shield by a flexible diaphragm arrangement but in the case illustrated in Figs. 3 and 4, two side-by-side diaphragm discs 49 are used (to provide a greater measure of flexibility in the axial direction combined with strength in all other directions), and each of these discs is split by a plurality of three arcuate openings 49a (each about 90° long) so as to form arms about 30° wide which join an inner portion (having the inner bolt circle extending through the centers of bolts 48) and an outer portion which has an outer bolt circle extending through the location of bolts 50 which secure the diaphragms 49 to a radially extending rabbetted arcuate face 51 of the shield 41. In the embodiment shown in Figs. 3 and 4 no bosses are provided on the cartridge and a separate ring member 52 (inserted between head of each bolt 48 and the diaphragm discs) presses the inner portion of the discs flat against the corresponding face of the cartridge without any beam action in a circumferential direction at this point of attachment, the entire circumferential beam action taking place at the outer bolt circle where pressure plates 53 are provided on each side of the diaphragms and interconnecting two adjacent bolts 50 at each 120° spaced apart location. These 120° spaced apart points of attachment (of the diaphragms to end shield) are located intermediate the 120° spaced apart arms formed between the annular openings 49a. This diaphragm design permits axial movement by the same theory of three beams working in parallel, clamped on the ends (i. e., at the pressure plates 53) and loaded in the middle of the beams (i. e., at the arms intermediate the slots 49a).

It will be observed that while in Figs. 1 and 2 the attachments from diaphragm to cartridge and from diaphragm to end shield are all at the same diameter, these supports are circumferentially displaced. In Figs. 3 and 4 the attachments from diaphragm to cartridge are at a different diameter than the attachments from diaphragm to end shield, and in some cases at the same radial location, but with either embodiment, the resilient mounting depends upon the flexing of circumferentially extending diaphragm fibers axially about points of projection, in Figs. 3 and 4 these points being defined by the pressure plates 53. Making all the attachments at the same diameter as in Figs. 1 and 2 saves space, which is of importance for the smaller constructions, but the split diaphragm construction of Figs. 3 and 4 has the advantage of great flexibility together with ease of manufacturing and the added advantage that air can be passed through the openings 49a to aid in ventilating the interior of the associated dynamoelectric machine. In either design a projection, whether it be boss, washer, pressure plate, or some other sort of projection, permits the diaphragm to bend about each position where it is attached to at least one cooperating member so that the load is applied as to a plurality of beams fixed on the ends and loaded in the middle with a consequent tremendous mechanical advantage through the principle of resolution of forces whereby relatively great axial flexibility can be realized while retaining rigidity against movements in other directions.

With the arrangement herein illustrated and described, desirable flexibility and simplicity is provided for mounting a bearing unit in a limited space so that no movement of the outer race is possible in a radial or circumferential direction while the bearing unit is free to move a limited amount in an axial direction. The constructions described allow belt pull or side thrust without distortion or change in the air gap of an electric machine, and in any sort of machine with a construction of the type described a flexible mounting having substantial rigidity in two dimensions is permitted to flex a relatively great amount in a third dimension without the necessity of stretching fibers beyond their elastic limit.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In a rotating machine having a stationary portion, a rotatable shaft, an antifriction bearing unit supporting said shaft, an annular housing clamping said bearing unit to support it and prevent rotation thereof, a flexible diaphragm disc connected to said housing at a first plurality of circumferentially spaced points and connected to said machine stationary portion at a second plurality of circumferentially spaced points, and means including radially extending circumferentially spaced projections at the points of at least one of said pluralities of spaced points to provide in said disc a plurality of circumferentially extending flexible beam arms to permit limited axial movement of said bearing unit and shaft while holding the same rigidly against radial and circumferential displacement with respect to said machine stationary portion.

2. In combination an antifriction bearing unit, a housing clamped to said unit, a thin metal disc for supporting said housing, and a stationary member for supporting said disc, said disc being secured to said housing at radially spaced apart points and secured to said stationary member at radially spaced apart points with said disc free to pivot about at least some of said points to form in said disc a plurality of circumferentially extending flexible beam arms each substantially fixed at its ends and loaded intermediate said ends.

3. In a dynamoelectric machine having a stationary portion, a rotatable shaft, a bearing unit for supporting said shaft, an annular supporting member for said bearing unit, said annular supporting member being provided with a plurality of circumferentially spaced bosses, a thin disc member of spring steel connected at said bosses to said annular supporting member, said stationary portion being likewise provided with a plurality of circumferentially spaced bosses, said ring being connected to said stationary portion bosses intermediate said annular supporting member bosses, whereby said ring may act as a plurality of annular beams fixed at their ends and loaded intermediate said ends to hold said bearing annular supporting member against radial and circumferential displacement while within limits allowing free axial movement thereof due to load applied in an axial direction and consequent large mechanical advantage.

4. In a dynamoelectric machine, a construction like that of claim 3 having, in addition, at least one washer inserted between said disc member and each of the bosses of at least one of said pluralities of circumferentially spaced bosses.

5. In a dynamoelectric machine having an end shield, a rotatable shaft, a bearing unit for supporting said shaft, a bearing cartridge clamped to said bearing unit, said cartridge being provided with a plurality of circumferentially spaced bosses extending from the outer periphery thereof, said end shield being provided with a plurality of circumferentially spaced bosses extending inwardly from the inner periphery thereof and disposed at angular intervals between said cartridge bosses, and a spring steel annular disc member rabbeted in radially extending faces of all of said bosses, whereby said disc may act as a plurality of circumferentially extending beams each fixed at the ends and loaded at a midpoint so that said mentioned bearing unit may move axially to compensate for manufacturing tolerances and for differential expansions due to heat, while said ring rabbeted in said bosses preserves concentricity of said shaft with respect to said end shield.

6. A dynamoelectric machine having an end bracket member, a rotatable shaft, a bearing unit for supporting said shaft, a housing member for said bearing unit, a split diaphragm bolted to said end bracket member at an outer bolt circle diameter and bolted to said bearing housing member at an inner bolt circle diameter and provided with a plurality of arcuate openings circumferentially spaced around said disc between said two bolt circle diameters, and a plurality of axially projecting circumferentially spaced projections interposed between said diaphragm and at least one of said interconnected members to permit flexing of said diaphragm to allow axial movement of said bearing housing member with respect to said end bracket member.

7. A dynamoelectric machine having an end shield, a rotatable shaft, a bearing unit for supporting said shaft, an annular bearing cartridge clamped on said bearing unit, said bearing cartridge having a radially extending face with an annular rabbet therein, a plurality of spring steel diaphragm discs seated in said rabbet and clamped to said cartridge at said radially extending face and extending radially outward therefrom, said discs having a plurality of arcuate openings located outside of said cartridge and defining radially extending arms between said openings, said openings joining a portion of each disc adjacent said cartridge with a portion of each disc outside of said openings and said radially extending arms, said end shield having a radially extending flange portion, said disc being secured to said flange portion at points outside of said arcuate openings and intermediate said radially extending arms, and pressure plates adjacent said points of attachment between said discs and said flange portion, whereby the circumferentially extending fibers of said discs may flex between said points of attachment and said radially extending arms connecting the portions of said discs attached to said cartridge.

ALEC FISHER.

References Cited in the file of this patent

UNITED STATES PATENTS

| Number | Name | Date |
| --- | --- | --- |
| 1,636,293 | Davey | July 19, 1927 |
| 1,671,720 | Holdsworth | May 29, 1928 |
| 2,523,983 | Arms | Sept. 26, 1950 |
| 2,532,327 | Parks | Dec. 5, 1950 |

FOREIGN PATENTS

| Number | Country | Date |
| --- | --- | --- |
| 73,483 | Sweden | Mar. 6, 1931 |